(12) United States Patent
Anderson et al.

(10) Patent No.: US 8,233,671 B2
(45) Date of Patent: Jul. 31, 2012

(54) READING DEVICE WITH HIERARCHAL NAVIGATION

(75) Inventors: Gretchen Anderson, San Francisco, CA (US); Jeff Witt, Baltimore, MD (US); Ben Foss, San Francisco, CA (US); J M Van Thong, Arlington, MA (US)

(73) Assignee: Intel-GE Care Innovations LLC, Roseville, CA (US)

( * ) Notice: Subject to any disclaimer, the term of this patent is extended or adjusted under 35 U.S.C. 154(b) by 1217 days.

(21) Appl. No.: 11/965,658

(22) Filed: Dec. 27, 2007

(65) Prior Publication Data

US 2009/0169061 A1  Jul. 2, 2009

(51) Int. Cl.
*G06K 9/00* (2006.01)
(52) U.S. Cl. ........................................ 382/114; 434/112
(58) Field of Classification Search .................. 382/114, 382/229–231; 434/112
See application file for complete search history.

(56) References Cited

U.S. PATENT DOCUMENTS

| | | | |
|---|---|---|---|
| 5,625,711 A * | 4/1997 | Nicholson et al. ............. 382/224 |
| 5,875,428 A | 2/1999 | Kurzweil et al. |
| 6,014,464 A | 1/2000 | Kurzweil et al. |
| 6,033,224 A | 3/2000 | Kurzweil et al. |
| 6,035,061 A | 3/2000 | Katsuyama et al. |
| 6,052,663 A | 4/2000 | Kurzweil et al. |
| 6,115,482 A | 9/2000 | Sears et al. |
| 6,173,264 B1 | 1/2001 | Kurzweil et al. |
| 6,199,042 B1 | 3/2001 | Kurzweil et al. |
| 6,246,791 B1 | 6/2001 | Kurzweil et al. |
| 6,289,121 B1 | 9/2001 | Abe et al. |
| 6,320,982 B1 | 11/2001 | Kurzweil et al. |
| 6,385,350 B1 * | 5/2002 | Nicholson et al. ............. 382/309 |
| 6,587,583 B1 | 7/2003 | Kurzweil et al. |
| 7,123,292 B1 | 10/2006 | Seeger et al. |
| 7,194,411 B2 * | 3/2007 | Slotznick et al. ............. 704/271 |
| 7,697,757 B2 * | 4/2010 | Yacoub et al. ................ 382/176 |
| 2002/0067859 A1 * | 6/2002 | Nicholson et al. ............. 382/229 |
| 2002/0178007 A1 * | 11/2002 | Slotznick et al. ........... 704/270.1 |
| 2003/0063335 A1 | 4/2003 | Mandel et al. |
| 2004/0010758 A1 * | 1/2004 | Sarkar et al. .................. 715/531 |
| 2004/0186713 A1 * | 9/2004 | Gomas et al. ................ 704/235 |
| 2005/0286743 A1 | 12/2005 | Kurzweil et al. |

(Continued)

FOREIGN PATENT DOCUMENTS

KR  10-2000-0063969 A  11/2000

(Continued)

OTHER PUBLICATIONS

International Search Report/Written Opinion for Patent Application No. PCT/US2008/067237, mailed Oct. 29, 2008, 10 Pages.

(Continued)

*Primary Examiner* — Bhavesh Mehta
*Assistant Examiner* — Sean Motsinger
(74) *Attorney, Agent, or Firm* — Pillsbury Winthrop Shaw Pittman LLP (57) ABSTRACT

In some embodiments, disclosed is reading device that comprises a camera, at least one processor, and a user interface. The camera scans at least a portion of a document having text to generate a raster file. The processor processes the raster file to identify text blocks. The user interface allows a user to hierarchically navigate the text blocks when they are read to the user.

20 Claims, 6 Drawing Sheets

U.S. PATENT DOCUMENTS

| | | |
|---|---|---|
| 2005/0288932 A1 | 12/2005 | Kurzweil et al. |
| 2006/0011718 A1 | 1/2006 | Kurzweil et al. |
| 2006/0013483 A1 | 1/2006 | Kurzweil et al. |
| 2006/0235855 A1* | 10/2006 | Rousseau et al. ............ 707/100 |
| 2006/0285746 A1* | 12/2006 | Yacoub et al. ................ 382/176 |
| 2007/0009161 A1* | 1/2007 | Hollingsworth ............. 382/229 |
| 2007/0217693 A1* | 9/2007 | Kretzschmar, Jr. ........... 382/229 |
| 2007/0230748 A1 | 10/2007 | Foss |
| 2007/0230749 A1 | 10/2007 | Foss |
| 2007/0230786 A1 | 10/2007 | Foss |
| 2007/0280534 A1 | 12/2007 | Foss |
| 2008/0114599 A1* | 5/2008 | Slotznick et al. ............. 704/260 |
| 2009/0169131 A1 | 7/2009 | Nestares |
| 2009/0172513 A1 | 7/2009 | Anderson |
| 2002/0245695 | 10/2009 | Foss |
| 2010/0198827 A1* | 8/2010 | Yacoub et al. ................ 707/739 |
| 2011/0029876 A1* | 2/2011 | Slotznick et al. ............. 715/727 |

FOREIGN PATENT DOCUMENTS

| | | |
|---|---|---|
| KR | 10-2006-0116114 A | 11/2006 |
| WO | 2009006015 | 1/2009 |

\* cited by examiner

402 — Dynamic-Threshold CMOS SRAM Cells for fast, Portable Applications

404 — Azeez J. Bhavnagarwala, Ashok Kapoor and James D. Meindl
*Microelectronics Research Cntr. and the School of Elec. and Comp. Eng., Georia Inst. of Tech., Atlanta, GA 30332*
LSI Logic Corporation, Milpitas, CA 95035

406 — Abstract

408 — A level quad-full CMOS SRAM cell architecture that doubles cell read current, improves cell static noise margin (SNM) by 70%, increases cell immunity to SR and lowers cell standby power by over an order of magnitude is proposed. These improvements are achieved by implementing a scheme of WL transition triggered pulses on source and substrate terminals of cell inverter transistors that share a common WI.

409 — Introduction

410 — With scaling of MOSFET dimensions, microscopic variations [1-3] in number and location of depart atoms in the channel region of the device induce increasingly limiting electrical deviations in device threshold voltage (Fig. 1) [3]. These atomic level intrinsic fluctuations cannot be eliminated by external control of the manufacturing process and an most pronounced in minimum geometry transistors commonly used in som e constrained circuits such as SRAM cells [4]. Narrow width effects, SER, low voltage operation, temperature and process variation, and periodic transistor resistance all contribute additionally to the increasing instability of a conventional 4T SRAM cell as well [5, 9]. With projected increase in percentage of chip transistors devoted to cache [8], in high performance microprocessors (Fig. 2) and ASICs, subthreshold centrifuge currents from an overwhelming number of inactive cells are projected to become larger than the AC currents from a much smaller number of active circuits [9] placing limits on the scaling of threshold voltage of cell transistors. The Bit Line (BL) delay determined primarily by BL capacitance, cell read current and sensibility of the sense amplifiers increasingly limits SRAM performance [10] since BL capacitance and sense amplifier sensitivity do not scale as rapidly as minimum feature size [5]. Raising the V of the cell transistors reduces standby power dissipation from the cell array to tolerate levels but imposes a severe penalty on BL delay by compressing cell read current drive of minimum geometry cell transistors. Several innovative SRAM cell architectures [11-13] have been proposed to alleviate one or more of the above limitations facing SRAM cell scaling However in all of these (i) the improvements is cell drive obtainable by cell voltage overdrive boosting an increase of cell scaling capacity as 412 — This work was supported by the Defense Advanced Research Project Agency. [Contract F1361595C162306, the Semiconductor Research Corporation (58-CM-CII).

414 — IMPOSTLM056789BHU and AMMSC

416 — dampened by the high $V_T$ of the cell and (u) the opportunity to use the substarate terminal of the cell transistors to control leakage and improve cell stability and performance is not pursued. In this work, we propose a new circuit technique that does not require rolling off *substantial leakage for cell drive*. By dynamically biasing the source-body junctions of all cell transistors, in cells driven by a common WL improvements achieved in cell read current by boosting cell voltages are not impeded by high $V_T$ required for low leakage. Off-chip quad-rail supplies are required and are shown no impose a minimal cost in cell area wiring complexity and recessing.

418 — Speed improvements for missing source terminals

420 — Driving the *source terminal of cell inverse MOSFETs* (Fig. 3 a, b) marginally outside the $V_{dr}$-0nd range by voltages less than the built-in potential of a p-n junction (to avoid excessive forward bias leakage translates into substantial increases in read current. This increase in read current is larger that the obtained by driving any of the other MOSFET terminals by the same voltage swing because all of the following contribute to drive increase (i) increase in gate-source voltage (ii) increase in drive-source voltage for device with finite output resistance and (iii) reductions in device threshold voltage due so forward bias on the source-body p-n junction. The series-connected cell access transistors drive more current as well since the low and high storage nodes of the cell are driven past the $V_n$ and $V_{ds}$ voltage levels (Fig. 4b), boosting the gate-source, drain-source and source-body voltages of the access transistors. *Both - the BL surcharge path as well as the BLB charge path are differed* translating into a doubling of cell read current (Fig. 4a).

422 — Stability and BL power impovements

424 — In a conventional CMOS SRAM cell, the "0" storage node voltage, rises above ground during a read access due to voltage division along the access and inverter pull-down NFET devices between the precharged high bit line and the ground terminal of the cell. The ration of the widths of the pull-down transistor to the access transistor, commonly referred to as the cell ratio or field ratio, determines how high the "0" storage node rises during a read access. Smaller cell ratio translate into a bigger voltage drop across the pull-down transistor requiring a smaller noise voltage at the "0" node to trip the cell. Driving the source terminals of the cell pull-down NFETs below $V_n$ ensures enough room for the voltage drop across the

READING DEVICE WITH HIERARCHAL NAVIGATION

BACKGROUND

The embodiments of the invention relate to a reading machine for impaired persons such as individuals who are visually impaired or have dyslexia.

People with disabilities, such as impaired vision or dyslexia, may have difficulty reading printed material. Automatic systems are needed to render documents as audio recordings.

It is known to provide a mobile print digitizer for the visually impaired. One known device captures printed documents and reads them to the user. A camera or scanner captures an image of a printed page, and then runs optical character recognition (OCR) on the image. The output is fed to a speech synthesizer such as a text-to-speech system (TTS). Unfortunately, existing systems can be inefficient in their ability to allow a user to efficiently navigate a document as the reader reads it to the user. Accordingly, new approaches are desired.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 4 is an exemplary portion of a scanned document showing block boundaries after the document has been OCR'd in accordance with some embodiments.

DETAILED DESCRIPTION

One of the challenges for users of reading devices is that with audio playback, textual hierarchy (e.g., outline organization) may be lost that would otherwise be conveyed, e.g., via size and formatting seen by visual users viewing the text. Accordingly, in some embodiments, a reading apparatus with an auditory presentation that preserves at least some of the intended hierarchy of information is provided. For example, in some embodiments, the user can navigate a given text by skipping through chunks of text delineated by differences in font size or weight, or commonly recognized words or symbols that indicate natural break points.

Figure 1:
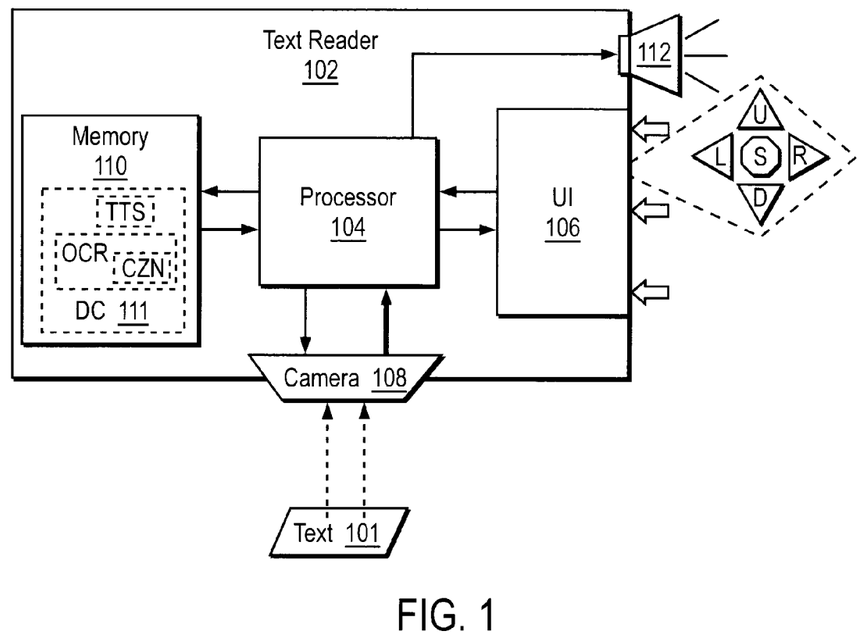
FIG. 1 is a diagram of a reading apparatus in accordance with some embodiments.

FIG. 1 shows a block diagram of a reading apparatus 102 to read to a user a document 101 to be scanned in accordance with some embodiments. Reader 102 generally comprises a processor 104, user interface 106, camera 108, memory 110, and auditory output device 112, coupled together as shown.

The processor and memory may comprise any suitable combination of memory and processing circuits, components, or combinations of the same to execute routines to control the reader 102. The memory 110 comprises device control (DC) software code 111 to control the reader 102 and execute its various functions. In the depicted embodiment, the device control code has several modules including optical character recognition (OCR) and text-to-speech (TTS) modules. The OCR module further includes a characterization (CZN) module. There may be more modules and in some embodiments, the modules may not necessarily be related to each other as shown.

The device control program controls scanning (digitized document acquisition), reading navigation, and general system functionality. The OCR module converts the pre-text (e.g., rasterized scanned image) document into text data, characterizes it, and reads it to a user through a convenient navigation interface. (As used herein, "reading" means to convey or provide text in an audio form to a user.)

The camera may comprise any suitable device such as a charge coupled device (CCD) camera to acquire a raster image of the text document 101, as is known in the art. It may scan a document line by line, section by section or it may image an entire page or sheet at once. Likewise, the auditory device 112 could comprise any suitable device to auditorily convey the read text to the user. For example, it could comprise one or more speakers and/or audio interface ports for connection to headphones or the like.

The user interface 106 may constitute any suitable components, known or not yet developed, to allow a user to conveniently control the reader. For example, the user interface could comprise one or more buttons, wheels, joysticks or other input control components that allow a user to manually control the reader without necessarily being able to see the user interface (i.e., control the components by feeling them). In some embodiments, the user interface includes a five button interface, such as that shown in FIG. 1, with up ("U"), down ("D"), left ("L"), right ("R"), and select ("S") buttons, to allow a user to conveniently navigate hierarchically through a document, as addressed more below.

The user interface could also include input ports (which may also function as output ports) such as universal serial bus (USB), so-called "Firewire", and/or wireless ports, e.g., to allow a user to import an electronic document that may or may not be in a text format. For example, portable document format (PDF) documents (or the like) could be imported for auditory reading to a user. In addition, the user interface could include speech-to-text capability, e.g., a microphone with suitable speech-to-text engine. Of course, as with any feature, especially those requiring substantial hardware and/or processing, trade-offs must be made between cost, power consumption, operating efficiency, performance accuracy, and feature capability.

Figure 2:
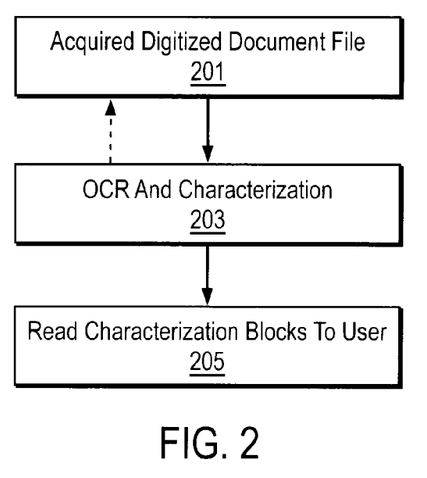
FIG. 2 is a flow diagram of a routine for implementing a reading apparatus in accordance with some embodiments.

FIG. 2 shows a routine for implementing a reader such as the reader 102 of FIG. 1. For example, it could be implemented with the software modules shown in FIG. 1. In some embodiments, conventional OCR and TTS modules may be used in cooperation with a CZN module designed to perform methods and concepts discussed herein. (This comprises developing an OCR with a suitable characterization capability, appropriately modifying and/or configuring an "off-the-shelf" OCR program to have suitable characterization, or another feasible approach.)

At 201, a digitized document with text to be read is acquired. This may be done through the importation of an electronic document or by scanning a document such as text-containing document 101 using the camera 108. The digital document file should be in a suitable form for the utilized OCR module. For example, many OCR packages typically accept raster image formats commonly found throughout the document management industry such as TIF, BMP, PCX and DCX, to mention just a few. Depending upon particular design considerations, a suitable OCR solution may be used to accept input from other sources such as fax input formats, PDF (or similar) formats, or common scanner driver formats such as TWAIN and ISIS.

At 203, optical character recognition (OCR) and characterization is performed on the acquired document file. Any suitable OCR tool (or module), presently available or specifically developed, capable of suitably identifying text layout and format attributes may be employed. Currently available OCR tools are generally flexible enough to conform to needed performance for techniques discussed herein.

Figure 6:
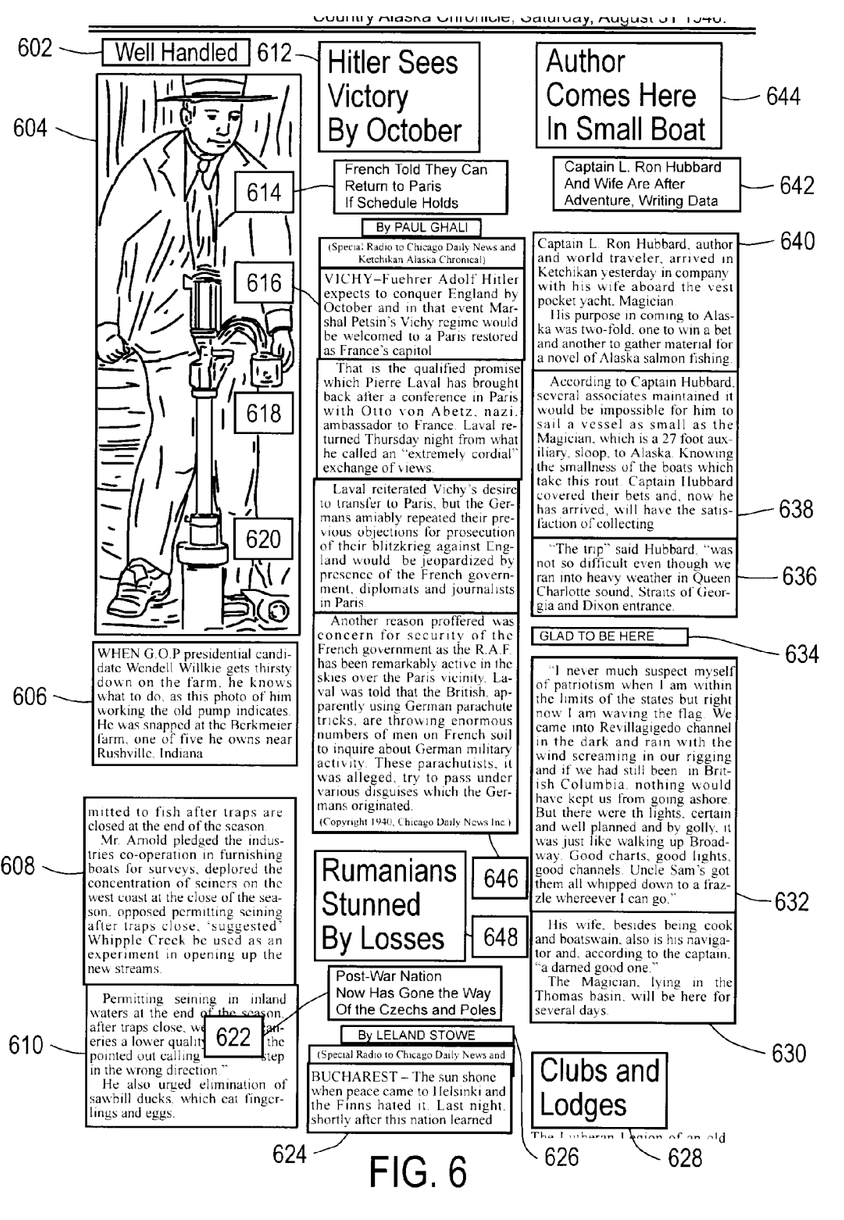
FIG. 6 is an exemplary portion of a scanned document, with multiple articles, showing block boundaries after the document has been OCR'd in accordance with some embodiments.

OCR modules generally perform text recognition by defining an area within a frame to be converted and then processing it and examining the results. They typically define vector bounding boxes around blocks or sections of text such as individual characters, sentences, lines, paragraphs, etc. This is illustrated in FIGS. 4 and 6. The bounding boxes identify text block layout and can also be used to identify format attributes such as font size and the like. For example, when a bounding box indicates the dimensions of a character, its font attributes or even style attributes can be determined directly using the character dimensions, character image mapping, character-to-area ratios, or the like. Other well-known methods can also be used for the OCR module to recognize text format attributes. For example, reference may be made to U.S. Pat. No. 6,741,745 to Dance et al., which is incorporated by reference herein.

OCR programs are usually fairly flexible in allowing designers to adjust software imaging attributes. Varying image attributes may enhance the manner in which the OCR software views text. For example, lowering the software, or display, resolution (e.g., not the scanned resolution) may allow the software to "see" a clearer image of the text thus improving the initial chances of correct recognition. Configuration settings may also be varied based on given design considerations. They can affect the format characteristics of what is being read such as text style (e.g., plain, italic, numeric, or image), text size, and font type.

Most OCR software allows the user to set margins of acceptable error when attempting to recognize a text image. Similarly, confidence levels for recognition depending on results of first iterations may be used and adjusted depending upon design considerations. Confidence levels are measures of certainty. Depending upon desired operating performance, different (e.g., two or more) different confidence levels could be used.

Error detection methodologies are also commonly employed. For example, error detection tools include spell checks and automatic corrections based on the software or user specific dictionaries. Various properties such as uppercase words, numeric expressions, roman numerals, proper nouns, math functions, abbreviation and acronyms may also be compared against appropriate more-particular dictionaries. Resolution of patterns involving text and numerals may be varied according to ambiguities dominant in the patterns.

With embodiments discussed herein, characterization, possibly among other things, involves characterizing OCR'd text blocks so that they may be read using hierarchy to allow a user to more efficiently navigate desired text to be read. More on this will be discussed with reference to FIGS. 3*a*, 3B, and 4-7 below.

Next, at 205, the OCR'd and characterized text is read to the user. Any suitable text-to-speech (TTS) solution may be used. In some embodiments, the user is allowed to navigate through the text sequentially or hierarchically. For example, in a hierarchal mode, with the user interface of FIG. 1, the right and left buttons could be used to move ahead or behind in equivalent levels (e.g., heading-to-heading in an article, title-to-title in a newspaper or magazine, or from chapter-to-chapter in a book). Likewise, the up and down buttons could be used for progressing to higher or lower levels, respectively. For example, when a desired heading is found, the user could press the down button to start reading the main paragraph text blocks under that heading. In the following sections, more on characterization will be addressed.

Figure 3A:
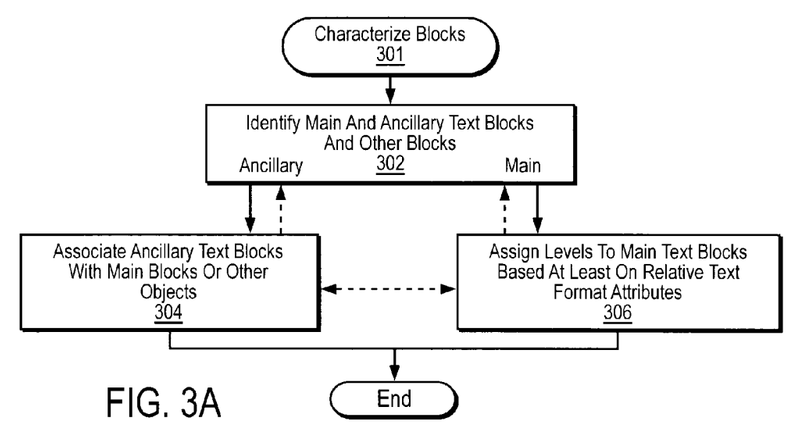
FIG. 3A is a flow diagram of a routine for characterizing OCR'd blocks in accordance with some embodiments.

FIG. 3A shows an exemplary approach for performing characterization 301. At 302, the routine identifies blocks as being a main text block, an ancillary text block, or as some other type of block (e.g., an image block). Main text blocks are blocks of text that are part of a sequential, e.g., intended beginning to end reading path. On the other hand, ancillary text is considered text such as figure descriptions, byline or bio type information, article identification information such as title, publication, page number, date, and the like. (These are not rigid definitions but rather, may vary depending on the accuracy of the OCR and text identification methods, for example, so that characterization is not so sensitive as to omit relevant information depending on a utilized navigation approach.)

Distinguishing between main and ancillary text blocks can allow for more efficient sequential reading capabilities. For example, a user might select to read sequentially only the main text in an article. In this way, ancillary text such as figure descriptors or footnotes could be referenced but not read so that the main text of the article could be more efficiently ingested.

(As used herein, the term "article" refers generally to any distinct text subject. For example, an article could be an actual article in a magazine or newspaper, or it could be a menu, a whole book, a prescription tag, a bill, or a receipt.)

Main and ancillary text blocks can be identified in any suitable way and will likely involve application of several different criterions. For example, continuity content analysis could be used. Alternatively or in addition, simpler characteristics such as relative layout and font characteristics, along with simple heuristics and/or assumptions could be applied. For example, Text blocks proximal to an image but different from a majority of text on a page could be presumed to be figure description text. Other types of ancillary text blocks could be identified in ways more particular to their specific attributes. For example, footnote references usually are numeric and are located in a superscript relationship at the end of a sentence or word. When a footnote is identified, the likelihood that its encompassing text block is a main text block is increased (i.e., may assume encompassing block is main text). In addition, the routine will know to "look" for a corresponding numeric (probably at the lower end of the page) leading a block of text that will likely be smaller than the encompassing text. It could then be reasonably assumed that this block(s) is ancillary text (and associated with the footnote reference). Other combinations of suitable criterion and/or assumptions could be used for similar or different types of ancillary (or main) text, and the invention should not be so limited.

At 304, the ancillary text is associated with appropriate main text blocks and/or with appropriate image or other types of blocks. This involves linking the ancillary text with the associated block so that it can be read if prompted or in a read mode where ancillary text is read. It also may involve linking (e.g., sequentially) the ancillary text with other related ancillary text. For example, byline type information such as author information, accreditation information, etc., could be linked as ancillary text to a common main title text block.

Ancillary text blocks may be associated with main text or other block types in any suitable way. As with other aspects of characterization, it may take into account (or even be driven by) the layout of the page. For example, the routine may follow printing rules, e.g., with magazine, journal, book specific printing rules. As already discussed, it should also consider unique characteristics of already identified blocks. For example, image blocks likely have associated descriptive ancillary blocks, footnote reference numbers will likely have associated footnote text, and a text block, aligned with an identified title block may likely be ancillary byline text.

At 306, hierarchy levels are assigned to main text blocks. The assignments are made at least based on text format attributes. Any suitable attributes and/or filters can be used to assign different relative levels. For example, in some embodiments, text that is 10% larger or greater than the majority of text in a different block could be tagged as a higher level. For a given article, there may be many different sizes and types, so alignment and style could also be taken into account. The content of the text itself could also be considered.

For example, certain phrases may be identified as being more likely to be a header or title, rather than a narration such as in an article paragraph. Actual key words could also be recognized. For example, in a book, the word "Chapter n" could be interpreted as a chapter break, especially if not surrounded by words or if larger and/or with a different font than words proximal to it.

Headers, for example, could be detected by the combination of different size, font, and lack of ending punctuation. Magazine editors are currently fond of splashing text in the middle of articles, functioning as a skimming aid or attention-getter, which varies in size or color. Sometimes two or three sizes may be used with one of these sentences, as a way to grab attention. Sometimes the size changes are counter-intuitive (smaller text used to grab attention). Therefore, position of the text in the block could be a factor in the presentation, with text in a similar font, but different than the article body being called out as a heading.

(The dotted arrows in the flow diagram are meant to indicate that the depicted block processes do not necessarily occur sequentially. That is, they may be running concurrently with each other and be affected by characterizations, identifications, and OCR'ing that has already occurred. They also may affect how each other processes its tasks and certainly can affect how OCR'ing and even digitized document acquisition is occurring. For example, as already discussed, when a footnote reference is identified at block 306, this information may be made available to 302 and 304, which could influence them in characterizing an appropriate block, e.g., near bottom of page with leading matching numeric, to be characterized as associated ancillary text. As another example, in any aspect of characterization, the routine might instruct the OCR process to increase software resolution in a certain area if certain text is "expected" but not yet identified. Accordingly, it should be appreciated that the routine blocks and processes discussed herein may be performed in various orders and will likely affect each other, e.g., sequentially, iteratively, and/or otherwise.)

Figure 3B:
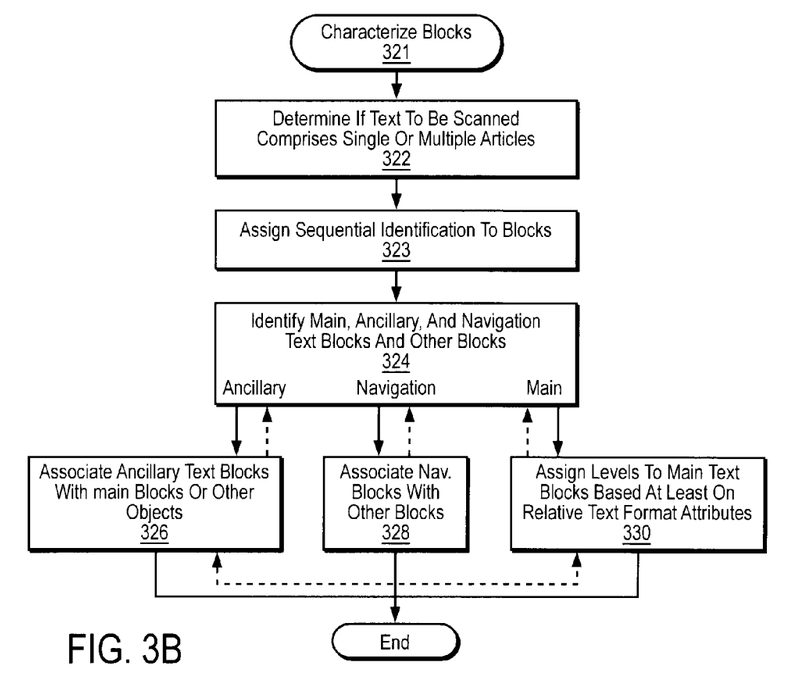
FIG. 3B is a flow diagram of a routine for characterizing OCR'd blocks in accordance with other embodiments.

FIG. 3B shows another embodiment of a characterization routine, a modification of the routine of FIG. 3A, for performing block characterization 205. At 322, it determines if the scanned text corresponds to a single article (e.g., book, menu, instructions) or to multiple articles (e.g., a newspaper page or magazine section). This can allow it to use separate (particularized) heuristics for each situation to make characterization more efficient and/or more accurate. For example, if the routine knows that it is characterizing blocks constituting multiple articles, it may place more emphasis on searching for connecting navigational text such as continuation references and the like. This could even be incorporated into the OCR and/or target acquisition (e.g., scanning) processes, for example, to increase software or scanning resolution in areas where such connectors may be expected.

At 323, sequential identification is assigned to the blocks. This may comprise ordering the blocks (indicated with the vector bounding boxes) based on their relative positions to one another. For example, as with the examples of FIGS. 4 through 7, a left-to-right and top-to-bottom ordering scheme may be used.

At 324, the blocks are identified as main, ancillary, navigational, or other. Main and ancillary text may be identified as discussed above. Navigational text is text such as page numbers, column numbers, page or article continuation references (e.g., "continued from page 23"), and the like. They may be used to more efficiently piece together a sequence of main text blocks for a given article.

At 326 and 330, ancillary block association and main block level assignments, as discussed previously, are performed. At 328, navigational text blocks are associated with other relevant blocks. For example, they may be associated with main or ancillary text (e.g., page numbers associated with narrative text, footnotes, etc. on the page) and/or they may be linked with other navigation blocks. For example, page numbers would likely be linked with previous and/or subsequent page numbers.

FIG. 4 shows a portion of an article with indicated block boundaries 402 to 426. This scanned document is from a single article with a title (402). byline information 404, headings (406, 409, 418, 422), footnote text (412), article identifier text 414, and page identifier 426. (Note that these block boundaries may be the product of additional block definition refinement after initial OCR bounding boxes have been generated. Depending on the utilized OCR module, bounding boxes may bind characters and words within sentences or paragraphs. Additional refinement may thus be desired to put these into more logically uniform blocks for reading to a user. For example, words could be put into sentence blocks and sentence blocks into paragraph blocks, etc. Note that the block outlines shown in FIGS. 5 and 7, for simplicity of presentation, do not show nested block boundaries within other boundaries, but such nesting may be implemented, regardless of whether separate vector boxes are actually generated. That is, blocks may include sub-blocks defined and/or identified in any suitable fashion. For example, paragraph main text blocks could include sub-block definition for sentences and words so that they may be separately read or skipped. Likewise, text blocks with footnote identifiers could include sub-block identification for the footnote numbers, as an example, so that they may be linked to the actual ancillary footnote text.)

Figure 5:
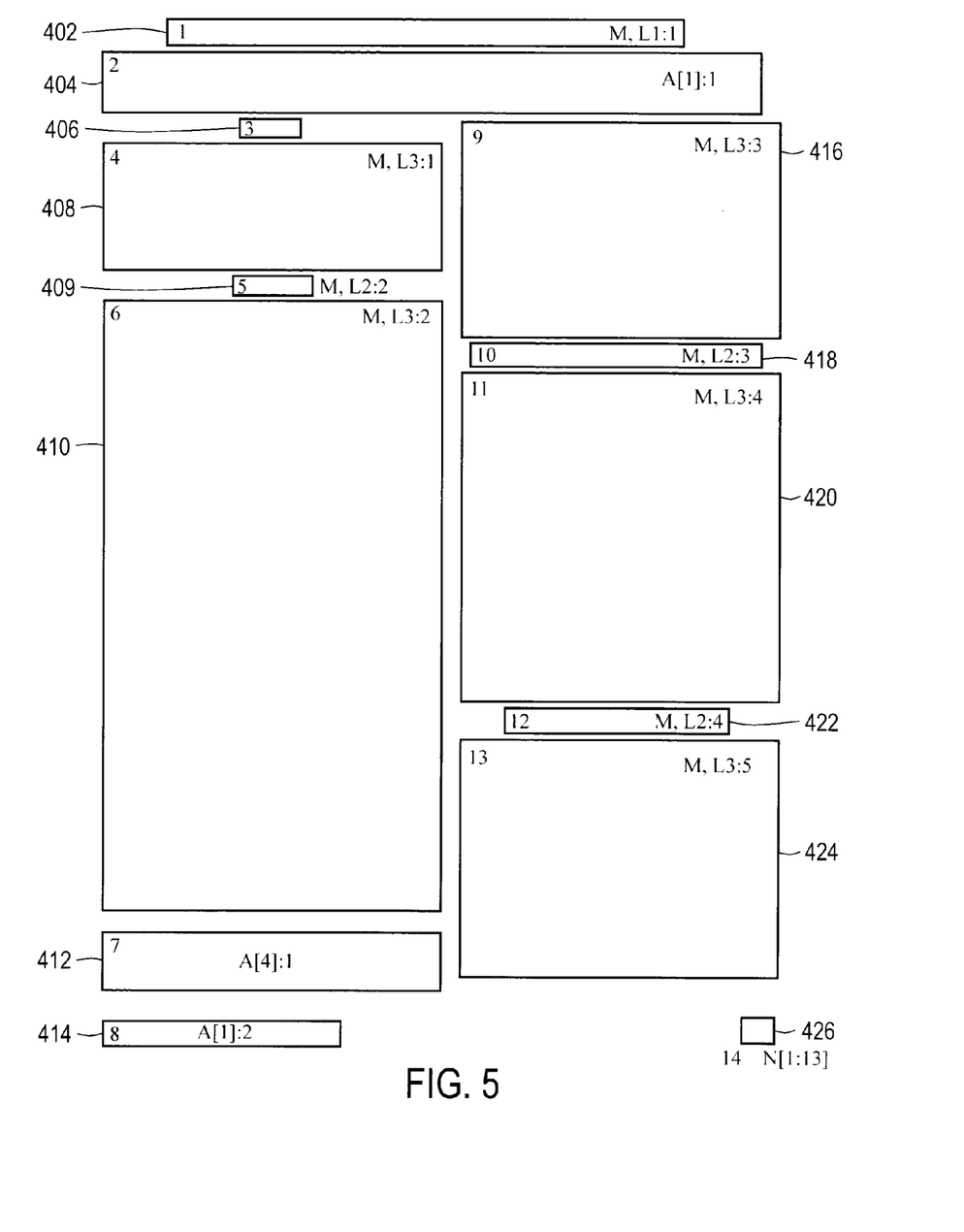
FIG. 5 shows the block boundaries from FIG. 4 with assigned main and ancillary block designations including hierarchal level in accordance with some embodiments.

FIG. 5 shows how the blocks from FIG. 4 may be assigned and associated, pursuant to the routines of FIG. 3A or 3B, in accordance with some implementations. As shown, they have been sequentially identified, independent of the type of box. (This numeric identifier is shown in the left or upper-left portion of each box.) Each main text block is identified with an "M", while each ancillary block is identified with an "A". The main text also has level designations with a sequence identifier for that level. For example, block 418, which is a heading, is the third level 2 block so it has an "L2:3" identifier.

Likewise, the ancillary blocks have association identifiers. For example, ancillary byline block 404 has an identifier of "A[1]:1", whereby the brackets identify the block from which it is associated (in this case, block 1), while the "1" after the ":" indicates that it is the first ancillary block associated with block 1 (also referenced as 402).

Figure 7:
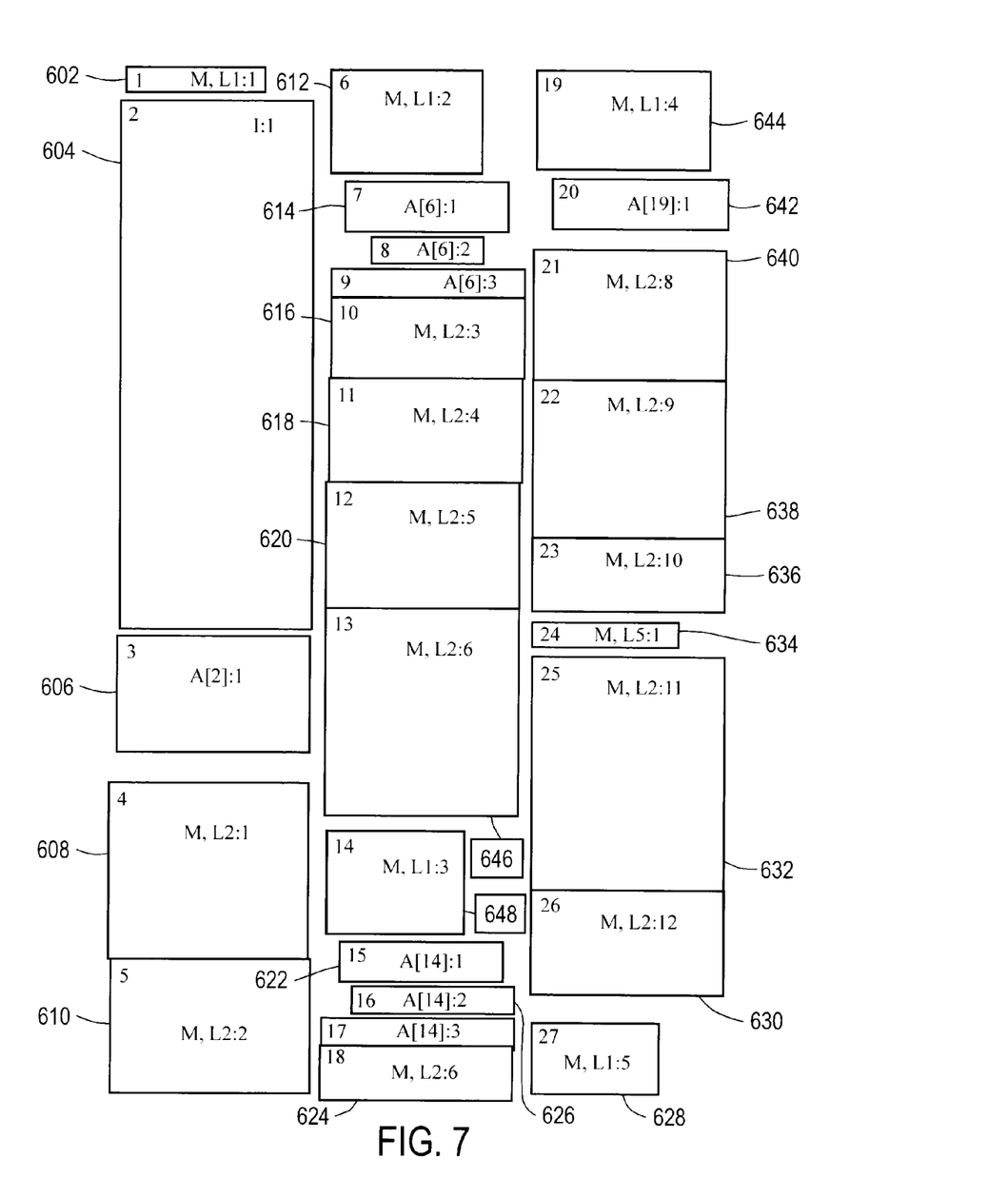
FIG. 7 shows the block boundaries from FIG. 6 with assigned main and ancillary block designations including hierarchal level in accordance with some embodiments.

FIGS. 6 and 7 similarly show another example of a text document portion that has been characterized. In this example, the document portion is from a multiple article document (i.e., a portion of a newspaper in this example).

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

The invention is not limited to the embodiments described, but can be practiced with modification and alteration within the spirit and scope of the appended claims.

It should be appreciated that example sizes/models/values/ranges may have been given, although the present invention is not limited to the same. As manufacturing techniques (e.g., photolithography) mature over time, it is expected that devices of smaller size could be manufactured. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. An apparatus, comprising:
an acquisition device configured to acquire a digitization of at least a portion of a document; and
at least one processor configured to characterize a first block of text from the portion of the document into a hierarchical level based at least on a format attribute in the first block and on a format attribute in a second block of text, the second block proximal to the first block, and to provide to a user an option to navigate the text blocks, as they are read to the user, based on the hierarchal levels, wherein the at least one processor is configured to discern whether a character dimension within the first block is bigger than a character dimension in a different block by about ten percent or more.

2. The apparatus of claim 1, in which the at least one processor is configured to characterize at least one of the text blocks as a main or ancillary text block.

3. The apparatus of claim 1, wherein the at least one processor is configured to discern different hierarchical levels based on the position of the text blocks relative to one another.

4. The apparatus of claim 3, wherein the at least one processor is configured to discern different hierarchical levels based on text content within the text blocks.

5. The apparatus of claim 1, comprising memory having an OCR module to generate the text blocks when executed by the at least one processor.

6. The apparatus of claim 5, comprising memory having a characterization module configured to characterize the text blocks when executed by the at least one processor.

7. The apparatus of claim 1, comprising an auditory device configured to provide to the user the read text in auditory form.

8. The apparatus of claim 4, wherein the processor is configured to change a scanning resolution for an area associated with one of the text blocks based on a type of content expected in the one of the text blocks.

9. A method, comprising:
scanning at least a portion of a document having text to generate a raster file;
processing the raster file to delineate text blocks;
characterizing a first text block of the text blocks into a hierarchical level based on a format attribute in the first text block and on a format attribute in a second text block proximal to the first text block; and
providing to a user an interface allowing the user to hierarchically navigate the text blocks as they are read to the user, wherein the characterizing the first text block into the
hierarchical level is based on whether a character dimension within the first text block is bigger
than a character dimension in a different block by about ten percent or more.

10. The method of claim 9, wherein the processing includes identifying the text blocks by performing optical character recognition on the raster file.

11. The method of claim 10, wherein the processing includes refining text blocks identified by the optical character recognition into more logically uniform text blocks.

12. The method of claim 11, wherein the more logically uniform text blocks comprise sub text blocks.

13. The method of claim 10, wherein the characterizing is further based on relative text block position.

14. The method of claim 13, further comprising changing a scanning resolution for an area associated with one of the text blocks based on a type of content expected in the one of the text blocks.

15. The method of claim 10, wherein the processing depends on input identifying whether the scanned document portion includes more than one article.

16. A reading device, comprising:
a camera configured to scan at least a portion of a document having text;
at least one processor configured to identify text blocks and to characterize a first text block of the text blocks into a hierarchical level based at least on a format attribute in the first text block and on a format attribute in a second text block proximal to the first text block; and
a user interface to allow a user to hierarchically navigate the text blocks when read to the user,
wherein the at least one processor is configured to characterize the first text block into a hierarchical level based at least on whether a character dimension of the first text block is bigger than a character dimension in a different text block by about ten percent or more.

17. The device of claim 16, wherein the at least one processor is configured to perform optical character recognition to process the raster file.

18. The device of claim 17, wherein the at least one processor is configured to refine text blocks identified by the OCR module into more logically uniform text blocks.

19. The device of claim 18, in which the more logically uniform text blocks comprise sub text blocks.

20. The device of claim 16, wherein the at least one processor is further configured to change a scanning resolution for an area associated with one of the text blocks based on a type of content expected in the one of the text blocks.

* * * * *